April 18, 1950 — G. A. FINLEY — 2,504,403
AGRICULTURAL IMPLEMENT
Filed April 5, 1948 — 2 Sheets-Sheet 1
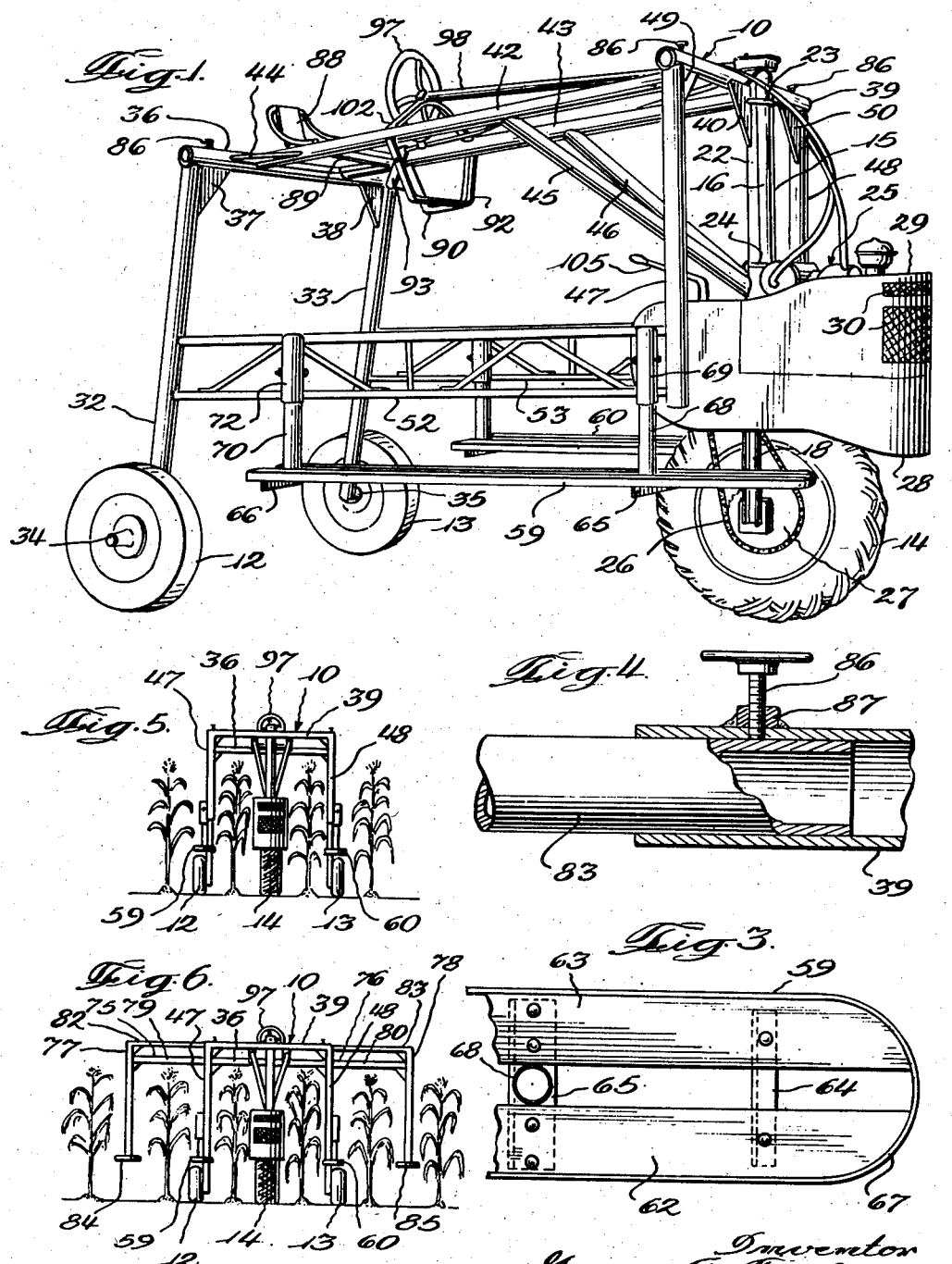

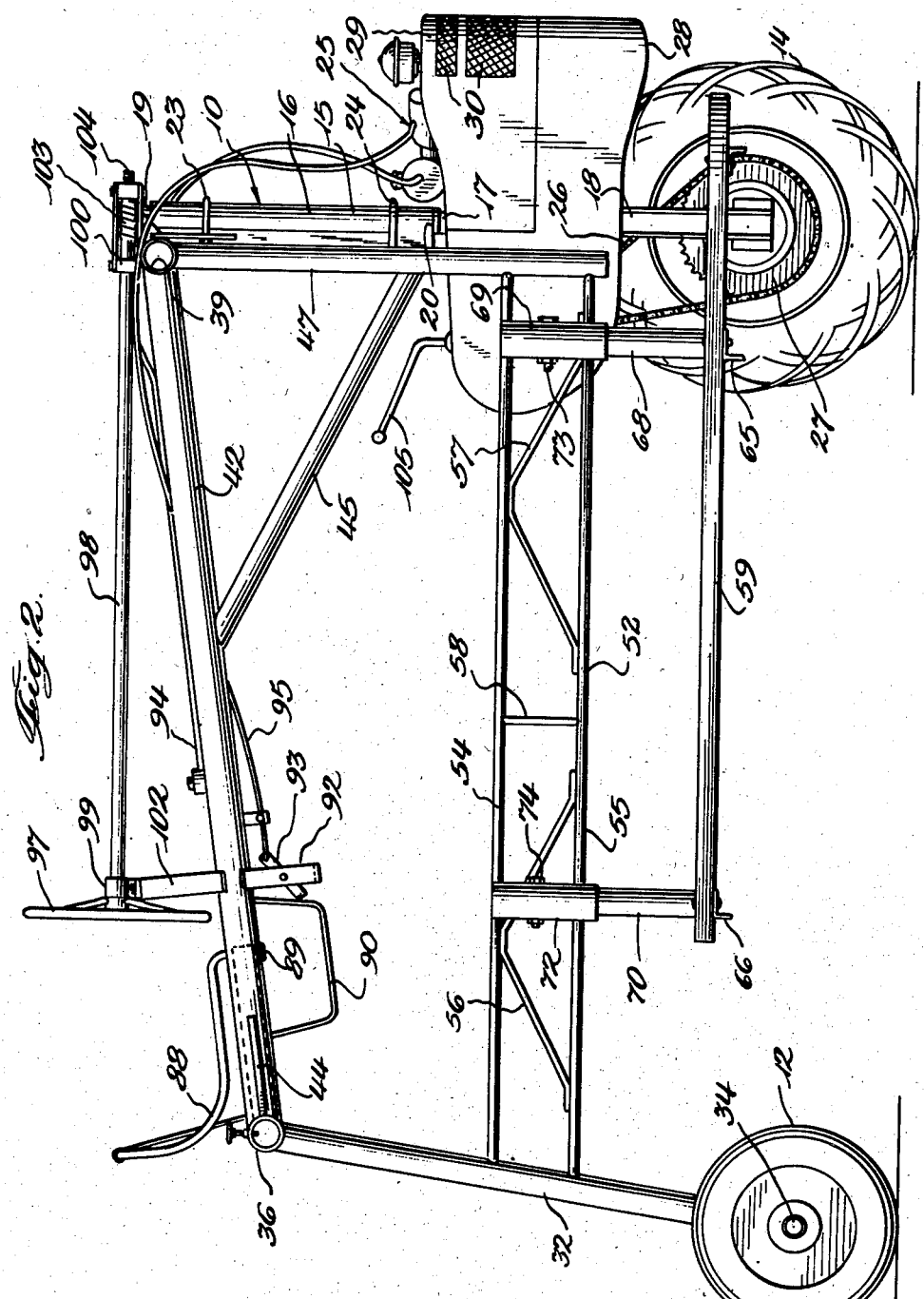

Patented Apr. 18, 1950

2,504,403

UNITED STATES PATENT OFFICE 2,504,403

AGRICULTURAL IMPLEMENT

George A. Finley, Sugar Grove Township, Kane County, Ill.

Application April 5, 1948, Serial No. 19,080

3 Claims. (Cl. 180—26)

This invention relates to agricultural implements, and more particularly to a self-propelled implement of considerable height adapted to move along the rows of tall crops, such as corn, without doing damage to the plants, and to carry a driver as well as other persons and/or plant treating equipment in predetermined relationship to the rows.

In the treatment of relatively tall crops, such as corn, without damaging the plants—particularly in operations such as detasselling of corn for the production of hybrid seed and the spraying of the plants in proper season require an implement having a frame of considerable height which must not only be rugged, but cannot have any low cross bracing structure lateral to its normal direction of movement. Being self-propelled, the implement carries a driver who preferably occupies an elevated position for supervising and regulating operations, as well as directing the course of implement travel. In detasselling corn, workers other than the driver are carried at positions between the corn rows to do the detasselling. This requires the structure of the implement to support considerable weight at positions spaced laterally of its normal direction of travel.

Since seed growers differ in their opinions in respect to the numbers of rows in their planting orders and the resultant number of rows to be detasselled, it is desirable that the implement structure shall be adaptable to the use of attachments by which the implement will carry detasselling personnel to suit the number of rows to be detasselled. Further than this, the implement being subjected to travel over soft and uneven ground, the necessary height and width, in addition to the heavy loads which are carried, complicate the provision of necessary strength and stability in view of the limitations on cross bracing. Then, as other considerations affecting both the stability and operation of a self-propelled implement, are the placement and support of the engine and the manner in which the tractive effort is attained.

In view of the foregoing and other considerations, it is one object of my invention to provide a self-propelled implement adapted to carry corn detasselling personnel between a plurality of corn rows and to carry a driver at a vantage point for controlling the implement, said implement being so constructed, arranged and motivated that it is durable and stable for such use and on the terrain encountered thereby.

As another object, it is within the purview of this invention to provide a relatively high frame structure and arrangement for a self-propelled agricultural implement suited to use in tall crops planted in rows, and which frame structure has the parts so relatively disposed and braced that the necessary strength and rigidity are accomplished without the use of cross parts or braces at positions likely to damage crops during movement therethrough.

My invention further has within its purview the provision of a relatively high and wide agricultural implement adapted to use on uneven ground and in which the supporting legs and wheels are disposed to promote operating stability and rigidity.

Other objects and advantages of the invention will be apparent from the following description and the accompanying drawings in which similar characters of reference indicate similar parts through the several views.

Referring to the two sheets of drawings,

Fig. 1 is a perspective view taken from somewhat in front of and to one side of a self-propelled agricultural implement embodying a preferred form of my invention;

Fig. 2 is a side elevational view of the implement shown in Fig. 1 and is drawn to a somewhat larger scale;

Fig. 3 is a fragmentary top plan view illustrating details of structure of a portion of the implement shown in Figs. 1 and 2;

Fig. 4 is a fragmentary view drawn to an enlarged scale with parts shown in section to illustrate a preferred manner of securing an attachment to the implement structure shown in Figs. 1 and 2; and Figs. 5 and 6 are small diagrammatic views illustrating the adaptation and preferred manner of use of my agricultural implement to the detasselling of different numbers of rows of corn.

While the basic structure of my agricultural implement, which is depicted in the accompanying drawings for illustrative purposes, is adapted to various uses including the dusting and spraying of crops by the addition of selected attachments thereto, it is shown, in the present instance, in its adaptation to the detasselling of corn. Having reference to the drawings, wherein an exemplary embodiment of the invention is disclosed, it may be generally observed that the implement comprises a supporting frame 10 which, by preference, and to distribute the weight of the implement over the ground between a plurality of crop rows while the frame bridges adjacent rows, is carried by three wheels 12, 13 and 14. In order that the implement will not damage the plants as it passes along the rows, it must not only have a height sufficient to clear the plants of the rows and a separation of the wheels and frame parts suited to rows in their usual spaced relationship, but also the use of cross structure, such as axles and lateral braces, is limited.

Referring more in detail to the structure of my disclosed implement, the frame has a front support post 15 which serves as a steering post and includes an upper stationary tube portion 16 and a lower portion 17 which is rotatable relative to the upper tube portion. The lower and rotatable portion 17 of the front post includes a fork 18 which straddles the front wheel 14 and has that front wheel supported for rotation by a suitable bearing between the lower ends of the fork legs. A post 19 (Fig. 2), which comprises an extension shaft on the fork 18, is journaled in and extends upwardly through the upper tube portion 16, with a thrust bearing 20 disposed between the upper and lower portions to facilitate the rotation of the lower portion relative to the upper portion. The front post 15 is, by preference, substantially vertical. Thus, the front wheel may be turned for steering about the axis of the post 19.

In the disclosed structure, the upper tube portion of the front post 16 is reinforced by an adjacent bracing beam 22 secured thereto by means such as U-bolts 23 and 24. In order to eliminate the necessity of a lateral driving connection between the rear wheels including a differential and to distribute the load on the wheels for purposes of stability, as well as to provide an effective and durable propelling arrangement, an internal combustion engine 25 is secured to and supported by the lower portion 17 of the front support post 15. The engine 25 is disposed somewhat above the front wheel 14 and drivingly connected thereto by a flexible driving element such as a chain 26 which extends from a suitable sprocket (not shown) on the engine to a sprocket 27 which is drivingly secured to the front wheel 14. As protection, and to improve the appearance of the implement, the side and front portions of the engine are covered by a shield 28 which includes a hingedly supported portion 29 which may be raised at the front for access to the engine. Also, the front of the hingedly supported portion 29 has screened openings 30 therein for the circulation of cooling air to the engine.

At the rear, my preferred implement frame has rear supporting legs 32 and 33 disposed in substantially coplanar and parallel relationship and extending upwardly from the wheels 12 and 13. Relatively short axles 34 and 35 have their ends secured to the lower ends of the rear legs 32 and 33 respectively, and extend outwardly therefrom, upon which axles the wheels 12 and 13 are rotatably mounted. In the disclosed embodiment of my implement, the legs 32 and 33 and their respective wheels 12 and 13 are spaced equidistantly on opposite sides of the front support post 15 and are separated from one another by an amount such that within reasonable limits of variation of crop row spacing, the rear wheels 12 and 13 pass along the outsides of the rows which the front wheel 14 passes between.

At their tops, the rear legs 32 and 33 are secured to and connected together by a cross member 36 which is preferably tubular. Gusset plates 37 and 38 are secured in the corners between the rear legs 32 and 33 and the cross member 36 laterally to rigidify the rear leg structure. At the front of the implement, a cross member 39 which is also preferably tubular and of a length substantially equal to that of the rear cross member 36 is secured to the top of the stationary portion of the front support post 15. The cross member 39 extends substantially equidistantly on opposite sides of the front support post and is disposed in parallel relationship to the rear cross member 36. Gusset plates such as 40 are secured in the corners between the front support post 15 and the cross member 39 on opposite sides of the front support post to increase the lateral rigidity of the structure.

At positions spaced inwardly from the ends of the cross members 36 and 39 longitudinal truss tubes 42 and 43 have their opposite ends secured to the cross members and extend longitudinally therebetween in substantially parallel relationship; the spacing of the longitudinal truss tubes being substantially equidistant on opposite sides of the front support post 15. Gusset plates, such as 44 are utilized at the intersections of the longitudinal truss tubes and the cross members 36 and 39 for improvement of lateral rigidity. Braces 45 and 46 extend forwardly and downwardly from the mid-portions of the longitudinal truss tubes 42 and 43 and converge to the front support post 15 at the lower end of the stationary portion 16 thereof. These braces, being secured, as by welding, to the mid-portions of the longitudinal truss tubes 42 and 43 and to the lower end of the stationary portion 16 of the front support post, they add both longitudinal and lateral stability to the frame structure without providing lateral cross structure at positions which will interfere with the passage of the implement along the rows of tall crops, such as corn.

As best shown in Fig. 2, the rear legs 32 and 33 extend downwardly in obtuse angular relationship to the longitudinal truss tubes 42 and 43, so as to be disposed at a rearwardly sloping angle toward the bottom with respect to the substantially vertical front support post 15. Although the acute angular relationship between the front support post 15 and the rear legs 32 and 33 is preferably small, this angular relationship adds effective strength to the frame structure by improving the operating stability of the legs, particularly for use on rough ground. The angle of slope of the rear legs 32 and 33 with respect to a vertical plane being relatively small, the vertical strength of the frame to static loads is not materially reduced. On the other hand, the tendency of the legs to flex forwardly and rearwardly, or to "walk" in passing over the irregularities of rough ground, is practically eliminated.

Further to rigidify the frame structure without the addition of low cross braces, side posts 47 and 48 have their upper ends secured to the outer ends of the front cross member 39 and extend downwardly therefrom in substantially parallel relationship to the front support post 15. These side posts are laterally braced at their upper ends by gusset plates 49 and 50 respectively. Also, they terminate at their lower ends, substantially above ground level.

Similar trusses 52 and 53 extend longitudinally on opposite sides of the implement frame in practically parallel relationship to the normal ground level and have their opposite ends secured to the lower end portions of the side posts 47 and 48 and the mid-portions of the rear legs 32 and 33 respectively. Each of the trusses 52 and 53 in the disclosed structure is composed, as shown in Fig. 2, of upper and lower longitudinal tubes 54 and 55 disposed in substantially parallel relationship with their opposite ends secured to the front side post and rear leg. By preference, bracing is provided between the longitudinal tubes 54 and 55 by formed diagonal braces 56 and 57 near opposite ends of the longitudinal tubes and an intermediate cross brace 58 between the diagonal braces.

In addition to bracing the frame structure of the implement, the longitudinal trusses 52 and 53 are utilized as load supporting elements for carrying worker supporting platforms 59 and 60 respectively which are utilized in work, such as the detasselling of corn, to carry workers along the corn rows at a level such that those workers may conveniently remove the tassels from the adjacent rows of corn plants.

As depicted in Fig. 3, each of the workers supporting platforms 59 and 60, in the disclosed structure, includes longitudinally extending planks 62 and 63 connected by cross members such as 64 and secured to forward and rear support brackets 65 and 66. By preference, a metal band 67 encompasses the outer edges of the planks.

To provide a vertically adjustable suspension by which the worker supporting platforms 59 and 60 are carried from the longitudinal trusses 52 and 53, telescopically engaging tubes 68 and 69 are secured to the support brackets 65 and the longitudinal truss 52 at the front end of the frame; while similar telescopically engaging tubes 70 and 72 are secured to the support brackets 66 and longitudinal truss 52 near the rear end of the frame. The supporting structures for the worker supporting platforms being similar, the description of one will suffice for both. Suitable pins or bolts 73 and 74 each passing through one of a series of aligned openings in the engaged telescoping tubes support the platforms at an adjusted height.

As shown in Fig. 5, the disclosed basic frame structure which has been thus far described is adapted to carry workers on the platforms 59 and 60 between separated rows of corn. With this arrangement, four rows of corn can be detasselled in one trip across a field by having one or more workers on each platform detassel the corn of the adjacent two rows. Some planters, however, utilize different planting orders or patterns so that there are either six or eight adjacent rows to be detasselled. For use in the latter instance, and so that a desired number of rows may be detasselled in one trip across the field, I have provided additional auxiliary supporting and bridging parts for carrying added worker supporting platforms on the same basic frame structure.

As has been previously mentioned, the rear and front cross members 36 and 39 respectively are desirably tubular in section. As illustrated in Figs. 4 and 6, I utilize the tubular cross members 36 and 39 to carry extension brackets 75, 76, 77 and 78 on opposite sides and at both the front and rear of the main frame 10. These extension brackets 75, 76, 77 and 78 have lateral extension tubes 79, 80, 82 and 83 respectively which telescopically fit into the opposite ends of the tubular cross members 36 and 39 and have suspended thereon worker carrying platforms 84 and 85 in spaced relationship to the platforms 59 and 60. Although there are various ways in which the extension brackets could be secured in place relative to their respective supporting cross members, I have utilized manually operable thumb screws such as 86 which are threaded into collars 87 secured to the outer surfaces of the cross members near their outer ends, which screws extend through apertures in the cross members to engage and secure the extension tubes in place.

In addition to the workers carried by the platforms, my disclosed implement also has a seat 88 located at a vantage point at the top and to the rear of the frame for carrying a driver. This seat is supported between the longitudinal truss tubes 42 and 43 at the rear ends thereof and secured to the rear cross member 36 and a support strap 89. At one side and adjacent the seat, a formed strap provides a step 90 secured to and dependent from the truss tube 43 for use in getting to the driver's seat. Also, a substantially U-shaped strap 92 having its opposite ends secured to the truss tubes 42 and 43 in front of the driver's seat provides a foot rest and a support for a movable foot control lever 93. Although there are various ways in which the engine and the movements of the implement could be controlled from the driver's seat, I utilize an automatically controlled clutch and effect the required manual control through flexible control cables 94 and 95, one end of one of which is connected to an end of the movable control lever 93.

Directly in front of the driver's seat 88, a steering wheel 97 is carried by a steering shaft 98, which shaft is supported for rotation by bearings 99 and 100. The bearing 99 is secured to a formed support strap 102 having its opposite ends secured to the truss tubes 42 and 43 near the driver's seat. At the front end a bearing 100 is secured to the top of the cross member 39. A worm gear 103 secured to the end of the steering shaft 98 meshes with the gear 104 which is secured to the upper end of the movable steering post extension 19, so that rotation of the steering wheel 97 turns the front fork and wheel relative to the frame. The engine being carried by the movable portion of the front post, turns with the front wheel, so that turning movement effects no change in the driving relationship between the engine and front wheel. A lever 105 is associated with a suitable transmission for shifting to different forward speeds or to reverse.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A self-propelled agricultural implement adapted to movement along rows of tall crops and comprising, in combination, a frame having a centrally disposed and substantially vertical front supporting leg including stationary and rotatable steering post parts and a front fork comprising a portion of the said rotatable part, laterally separated and substantially parallel rear legs connected at the top by a first cross member and disposed in a plane sloping rearwardly toward the bottom with respect to the front leg, frame means connecting the top portions of the front and rear legs and including a second cross member secured to and extending laterally of the top of the stationary steering post part of the front leg, a front wheel of large diameter mounted for rotation in said fork, rear wheels of smaller diameter supporting the lower ends of the rear legs, an engine mounted on the rotatable part of the steering post above the front wheel and having a driving connection to the front wheel, a driver's seat at the upper rear part of the frame, a steering mechanism for controlling the position of the rotatable steering post part and extending to a position near the driver's seat, side posts of shorter length than the steering post secured to and dependent from the second cross member in substantial alignment with the rear legs longitudinally of the frame, longitudinal truss members connecting said side posts and rear legs, and worker supporting platforms carried by said truss members on opposite sides of the frame.

2. A self-propelled agricultural implement adapted to movement along rows of tall crops and comprising, in combination, a frame having a centrally disposed and substantially vertical front supporting leg including stationary and rotatable steering post parts and a front fork comprising a portion of said rotatable part, laterally separated and substantially parallel rear legs connected at the top by a first cross member and disposed in a plane sloping rearwardly toward the bottom with respect to the front leg, frame means connecting the top portions of the front and rear legs and including a second cross member at the top of the stationary steering post part of the front leg, spaced longitudinal members secured to and extending between the first and second cross members, braces secured to and extending diagonally between the stationary steering post part of the front leg and the mid-portions of said longitudinal members, a front wheel of large diameter mounted for rotation in said fork, rear wheels of smaller diameter supporting the lower ends of the rear legs, an engine mounted on the rotatable steering post part above the front wheel and having a driving connection to the front wheel, a driver's seat at the upper rear part of the frame, a steering mechanism for controlling the position of the rotatable steering post part and extending to a position near the driver's seat, and worker supporting platforms carried on opposite sides of the frame.

3. A self-propelled agricultural implement adapted to movement along rows of tall crops and comprising, in combination, a frame having a centrally disposed and substantially vertical front supporting leg including stationary and rotatable steering post parts and a front fork comprising a portion of the said rotatable part, laterally separated and substantially parallel rear legs connected at the top by a first tubular cross member and disposed in a plane sloping rearwardly toward the bottom with respect to the front leg, frame means connecting the top portions of the front and rear legs and including a second tubular cross member secured to the top of the stationary steering post part of the front leg and extending in substantially parallel relationship to the first cross member, a front wheel of large diameter mounted for rotation in said fork, rear wheels of smaller diameter supporting the lower ends of the rear legs, an engine mounted on the rotatable steering post part above the front wheel and having a driving connection to the front wheel, a driver's seat at the upper rear part of the frame, a steering mechanism for controlling the position of the rotatable steering post part and extending to a position near the driver's seat, worker supporting platforms carried on opposite sides of the frame, and additional worker supporting platforms each suspended from the frame in spaced relationship to the first mentioned platforms by suspension brackets including arms telescopically engaging said tubular cross members.

GEORGE A. FINLEY.

REFERENCES CITED

The following references are of record in the file of this patent:

UNITED STATES PATENTS

| Number | Name | Date |
|---|---|---|
| 1,052,829 | Karminski et al. | Feb. 11, 1913 |
| 2,184,198 | Seeber | Dec. 19, 1939 |
| 2,457,821 | Johnson | Jan. 4, 1949 |